(12) United States Patent
Zurek, Jr.

(10) Patent No.: US 9,132,814 B2
(45) Date of Patent: Sep. 15, 2015

(54) SYSTEMS AND METHODS FOR VIBRATION MITIGATION IN A VEHICLE

(71) Applicant: GM GLOBAL TECHNOLOGY OPERATIONS LLC, Detroit, MI (US)

(72) Inventor: Marvin J. Zurek, Jr., Highland, MI (US)

(73) Assignee: GM GLOBAL TECHNOLOGY OPERATIOND LLC, Detroit, MI (US)

( * ) Notice: Subject to any disclaimer, the term of this patent is extended or adjusted under 35 U.S.C. 154(b) by 114 days.

(21) Appl. No.: 13/622,289

(22) Filed: Sep. 18, 2012

(65) Prior Publication Data

US 2014/0081516 A1 Mar. 20, 2014

(51) Int. Cl.
*G06F 7/00* (2006.01)
*B60T 8/173* (2006.01)
*B60T 13/66* (2006.01)
*B60W 30/20* (2006.01)

(52) U.S. Cl.
CPC ............... *B60T 8/173* (2013.01); *B60T 13/662* (2013.01); *B60W 30/20* (2013.01); *B60W 2710/182* (2013.01)

(58) Field of Classification Search
CPC . B60W 30/20; B60W 2710/182; B60T 8/173; B60T 13/662
USPC .......................................................... 701/36
See application file for complete search history.

(56) References Cited

U.S. PATENT DOCUMENTS

| | | | |
|---|---|---|---|
| 4,655,080 A * | 4/1987 | Ongaro | 73/462 |
| 5,220,506 A * | 6/1993 | Kuwana et al. | 701/79 |
| 6,104,593 A * | 8/2000 | Kawase et al. | 361/143 |
| 6,404,182 B1 * | 6/2002 | Kawase et al. | 324/173 |
| 6,874,857 B2 * | 4/2005 | Tanabe | 303/11 |
| 8,594,891 B2 | 11/2013 | Harder | |
| 2003/0041666 A1 * | 3/2003 | Parker | 73/462 |
| 2005/0274560 A1 * | 12/2005 | Wakao et al. | 180/197 |
| 2007/0255510 A1 * | 11/2007 | Mancosu et al. | 702/34 |
| 2009/0069149 A1 * | 3/2009 | Okumura et al. | 477/28 |
| 2010/0089139 A1 * | 4/2010 | Ivory et al. | 73/146 |
| 2011/0209536 A1 * | 9/2011 | Craig et al. | 73/146 |
| 2011/0307129 A1 | 12/2011 | Yu et al. | |
| 2012/0041660 A1 | 2/2012 | Killian et al. | |

FOREIGN PATENT DOCUMENTS

CN 101511659 A 8/2009

OTHER PUBLICATIONS

State Intellectual Property Office of the People's Republic of China, Office Action for Chinese Patent Application No. 201310427073.4 mailed Jun. 2, 2015.

* cited by examiner

*Primary Examiner* — Calvin Cheung
*Assistant Examiner* — Paula L Schneider
(74) *Attorney, Agent, or Firm* — Ingrassia Fisher & Lorenz, P.C.

(57) ABSTRACT

Methods and apparatus are provided for mitigating vibration in a vehicle. The apparatus can include a first sensor that generates a first signal that indicates a first phase angle of a first wheel of the vehicle and a second sensor that generates a second signal that indicates a second phase angle of a second wheel of the vehicle. The apparatus can further include a control module that based on the first signal and the second signal outputs a third signal to adjust at least one of the first phase angle and the second phase angle when the vehicle is experiencing a vibration.

17 Claims, 2 Drawing Sheets

SYSTEMS AND METHODS FOR VIBRATION MITIGATION IN A VEHICLE

TECHNICAL FIELD

The present disclosure generally relates to vibration mitigation and more particularly relates to systems and methods for vibration mitigation in a vehicle.

BACKGROUND

Generally, a vehicle can be operated over various speeds. In certain driving conditions, imbalances in the tire and wheel assemblies of the vehicle can cause the operator to experience vibrations during the operation of the vehicle. These vibrations experienced by the operator can lead to operator dissatisfaction, and warranty replacement of one or more component on the vehicle.

Accordingly, it is desirable to mitigate vibration experienced by the operator during the operation of the vehicle. Furthermore, other desirable features and characteristics of the present invention will become apparent from the subsequent detailed description and the appended claims, taken in conjunction with the accompanying drawings and the foregoing technical field and background.

SUMMARY

An apparatus is provided for a vibration mitigation system for a vehicle. In one embodiment, the apparatus can include a first sensor that generates a first signal that indicates a first phase angle of a first wheel of the vehicle and a second sensor that generates a second signal that indicates a second phase angle of a second wheel of the vehicle. The apparatus can further include a control module that based on the first signal and the second signal outputs a third signal to adjust at least one of the first phase angle and the second phase angle when the vehicle is experiencing a vibration.

A method is provided for mitigating vibration in a vehicle. In one embodiment, the method can include receiving an input, and based on the input, determining an amount of vibration experienced by the vehicle. The method can also include determining a first wheel phase angle associated with a first wheel and determining a second wheel phase angle associated with a second wheel. The method can include outputting a signal to adjust the first wheel phase angle or second wheel phase angle if the first wheel phase angle is different from the second wheel phase angle and the vehicle is experiencing a vibration.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
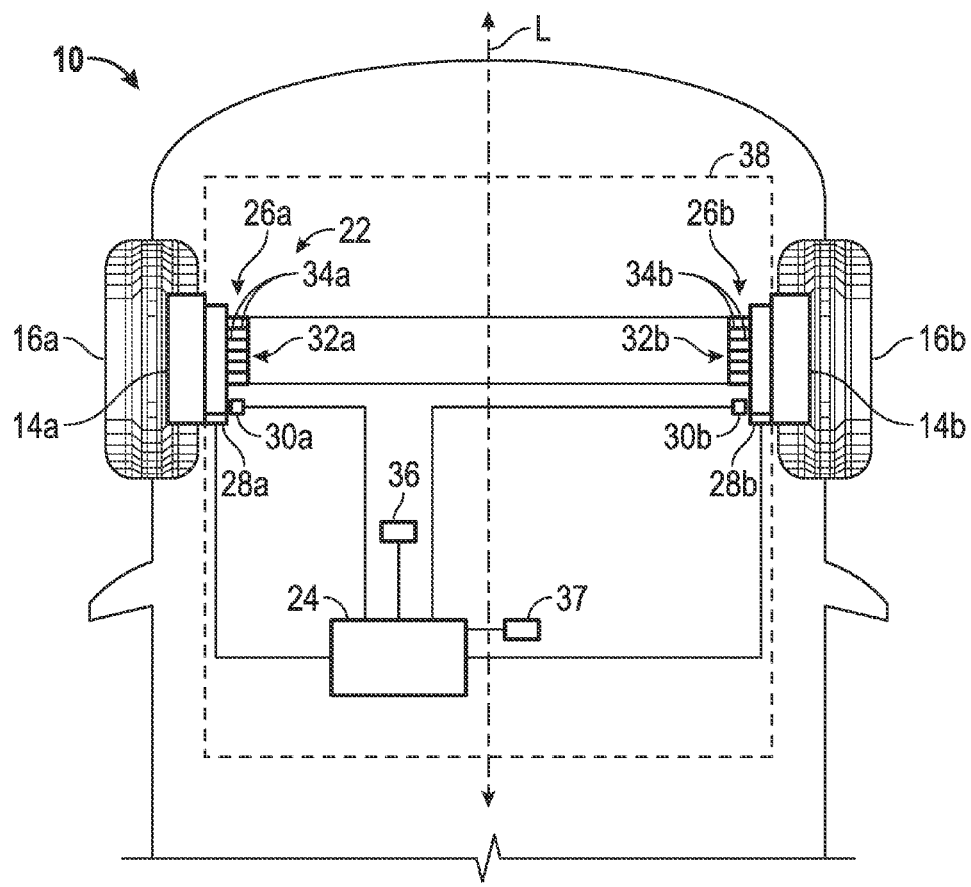
FIG. 1 is a functional block diagram illustrating a vehicle that includes a vibration mitigation system in accordance with various embodiments.

With reference to FIG. 1, a vehicle 10 is shown having a vibration mitigation system in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

The vehicle 10 can include wheels 14a, 14b, which can each be fitted with a tire 16a, 16b, respectively. Each wheel 14a, 14b can be coupled to a brake system 22, which can be controlled by a control module 24. Although the brake system 22 is shown to be associated with only two wheels 14a, 14b for ease of description (e.g., either front wheels or rear wheels), it is appreciated that the brake system 22 of the present disclosure is also applicable to all wheels (including others not shown) of the vehicle 10. Further, it should be noted that the brake system 22 illustrated and described herein is merely exemplary, as it can be appreciated that the brake system 22 can include various controlled braking systems including, but not limited to, braking systems with anti-lock brakes, regenerative braking, hydraulic braking systems, mechanical braking systems.

The brake system 22 can include at least a rotor 26a, 26b, a caliper 28a, 28b and a sensor 30a, 30b. The rotors 26a, 26b can be coupled to the wheels 14, 16 such that the rotors 26a, 26b rotate with the wheels 14, 16. The rotors 26a, 26b can each include a hat 32a, 32b. The hat 32a, 32b can include one or more teeth 34a, 34b. A respective sensor 30a, 30b can observe the teeth 34a, 34b and can generate sensor signals based on the observed conditions.

The calipers 28a, 28b can be coupled to respective rotors 26a, 26b. The calipers 28a, 28b can apply a braking force to slow the rotation of the rotors 26a, 26b, thereby slowing a rotation of the wheels 14a, 14b. The sensors 30a, 30b can detect and measure the speed of the rotation of the wheels 14a, 14b. In one example, the sensors 30a, 30b can observe the rotation of the teeth 34a, 34b and can generate a sensor signal that can indicate a speed and a phase angle of the wheels 14a, 14b based on the observation of the teeth 34a, 34b. For example, one or more of the teeth 34a, 34b could be spaced apart differently, which can enable the sensors 30a, 30b to determine the phase angle of the wheels 14a, 14b. As will be discussed further herein, once the phase angle of the wheels 14a, 14b is established, the phase angle of the wheel 14a and the phase angle of the wheel 14b can be monitored relative to each other and relative to a vibration, so that an optimal performance profile can be maintained.

The vehicle 10 can also include a first sensor 36 and a second sensor 37. The first sensor 36 can include an accelerometer, which can measure the acceleration of the vehicle 10 in response to a vibration and can generate accelerometer signals based thereon. The first sensor 36 can be coupled to any suitable portion of the vehicle 10, such as, but not limited to, a passenger cabin 38 of the vehicle 10, and can measure a lateral and vertical acceleration of the passenger cabin 38 in response to a vibration. In this example, as the passenger cabin 38 experiences a vibration, the passenger cabin 38 can move or oscillate in a lateral and/or vertical direction relative to a longitudinal axis of the vehicle 10. This movement of the passenger cabin 38 can be observed by the first sensor 36, and the first sensor 36 can generate sensor signals based on this observable condition of the passenger cabin. The second sensor 37 can include a speed sensor, which can measure the speed of the vehicle 10 and can generate speed signals based thereon. While illustrated as a discrete component, the second sensor 37 can be part of an engine control module associated with the vehicle 10, or the speed of the vehicle 10 could be estimated from other measured factors, such as the speed of the wheels 14a, 14b.

The control module 24 can control the brake system 22 based on signals received from the sensors 30a, 30b, first sensor 36 and second sensor 37, and further based on the vibration mitigation systems and methods of the present disclosure to mitigate vibration experienced by the vehicle 10. In various embodiments, the control module 24 can control the calipers 28a, 28b based on signals received from the sensors 30a, 30b, first sensor 36 and second sensor 37, and further based on the vibration mitigation systems and methods of the present disclosure.

Figure 2:
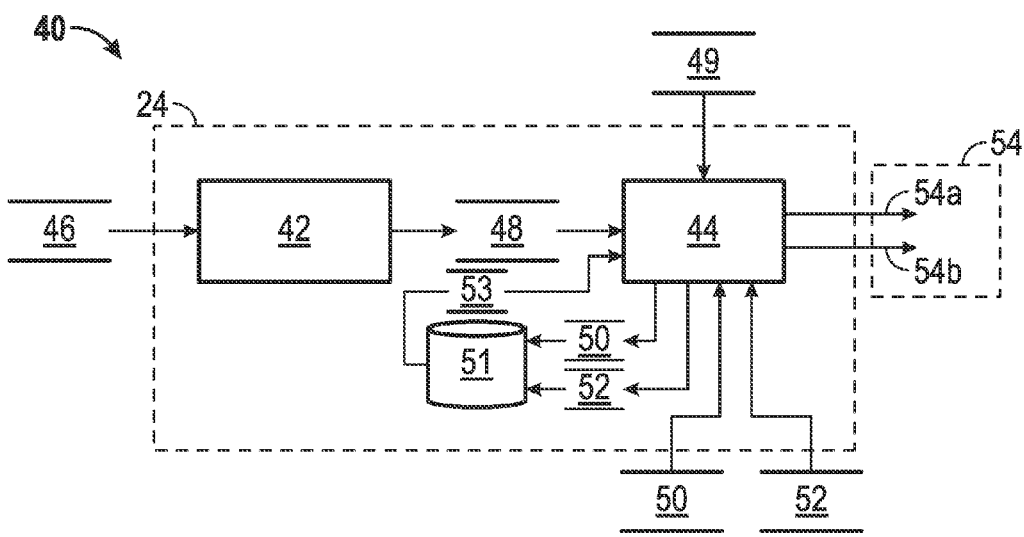
FIG. 2 is a dataflow diagram illustrating a control system of the vibration mitigation system in accordance with various embodiments.

Referring now to FIG. 2, and with continued reference to FIG. 1, a dataflow diagram illustrates various embodiments of a vibration mitigation control system 40 for the vibration mitigation system (FIG. 1) that may be embedded within the control module 24. Various embodiments of vibration mitigation control system according to the present disclosure can include any number of sub-modules embedded within the control module 24. As can be appreciated, the sub-modules shown in FIG. 2 can be combined and/or further partitioned to similarly mitigate the vibration experienced by the vehicle 10 (FIG. 1). Inputs to the system can be sensed from the vehicle 10 (FIG. 1), received from other control modules (not shown), and/or determined/modeled by other sub-modules (not shown) within the control module 24. In various embodiments, the control module 24 can include a vibration control module 42 and a mitigation control module 44.

The vibration control module 42 can receive as input accelerometer data 46 from the first sensor 36. Based on the accelerometer data 46, the vibration control module 42 can set vibration data 48 for the mitigation control module 44. The vibration data 48 can comprise an amount of vibration, lateral and vertical, experienced by the passenger cabin 38 during the operation of the vehicle 10 as observed by the first sensor 36.

The mitigation control module 44 can receive as input the vibration data 48 and speed data 49. The speed data 49 can comprise a speed of the vehicle 10 observed by the second sensor 37. The mitigation control module 44 can also receive as input wheel phase angle A data 50 from the sensor 30a and wheel phase angle B data 52 from the sensor 30b, along with last phase angle data 53. The wheel phase angle A data 50 can comprise a current phase angle of the wheel 14a, while the wheel phase angle B data 52 can comprise a current phase angle of the wheel 14b. The last phase angle data 53 can comprise the last measured phase angle of the wheel 14a and the last measured phase angle of the wheel 14b, which can be accessed from a data store 51. Based on the vibration data 48, speed data 49, wheel phase angle A data 50, wheel phase angle B data 52 and last phase angle data 53, the mitigation control module 44 can output a mitigation control signal 54.

The mitigation control module 44 can also store the wheel phase angle A data 50 and wheel phase angle B data 52 in the data store 51.

In this regard, the mitigation control module 44 can mitigate vibrations experienced by the vehicle 10 at predetermined speeds of the vehicle 10. In one example, based on the speed of the vehicle 10, the mitigation control module 44 can calculate the first order frequency of the vibration of the vehicle 10 as:

$$F = \frac{V_s}{7.2\pi r} \quad (1)$$

Wherein, F is the first order frequency, Vs is the speed of the vehicle 10 and r is the rolling radius of the wheels 14a, 14b. The vibrations occurring at the first order frequency F can be attributed to the differences between the phase angle of the wheel 14a and phase angle of the wheel 14b. When the phase angle of the wheel 14a and the phase angle of the wheel 14b are in optimal angular position relative to each other, the vibrations experienced by the operator of the vehicle 10 can be reduced. By observing and maintaining the relationship between the phase angle of the wheel 14a relative to the phase angle of the wheel 14b, the mitigation control module 44 can reduce the vibration experienced by the operator.

In one example, the mitigation control signal 54 can comprise a control signal 54a, 54b for the respective caliper 28a, 28b to apply the braking force to the respective wheel 14a, 14b so that the phase angle of wheel 14a is substantially equal to the phase angle of wheel 14b. In other words, based on the mitigation control signal 54, the control signals 54a, 54b are generated to control the respective caliper 28a, 28b to apply the braking force so that the phase angles of the wheels 14a, 14b are substantially the same. When the phase angles of the wheels 14a, 14b are substantially the same, the vibration experienced by the vehicle 10 can decrease in amplitude from about 25 to about 45 percent.

In one of various embodiments, the control signal 54a can be generated to control the caliper 28a to change the phase angle of the wheel 14a to substantially match the phase angle of the wheel 14b, or the control signal 54b can be generated to control the caliper 28b to change the phase angle of the wheel 14b to substantially match the phase angle of wheel 14a. As a further alternative, according to various embodiments, the control signals 54a, 54b can be output to control the calipers 28a, 28b to substantially simultaneously change the phase angles of the wheels 14a, 14b so that the phase angles of the wheels 14a, 14b are substantially the same. In addition, the control signals 54a, 54b can be output to control the calipers 28a, 28b to change the phase angles of the wheels 14a, 14b to the last known good phase angles for the wheels 14a, 14b. In other words, based on the last phase angle data 53, the mitigation control module 44 can output the control signals 54a, 54b to adjust the phase angles of the wheels 14a, 14b to the last measured phase angle in which the vehicle 10 was not experiencing a vibration.

Figure 3:
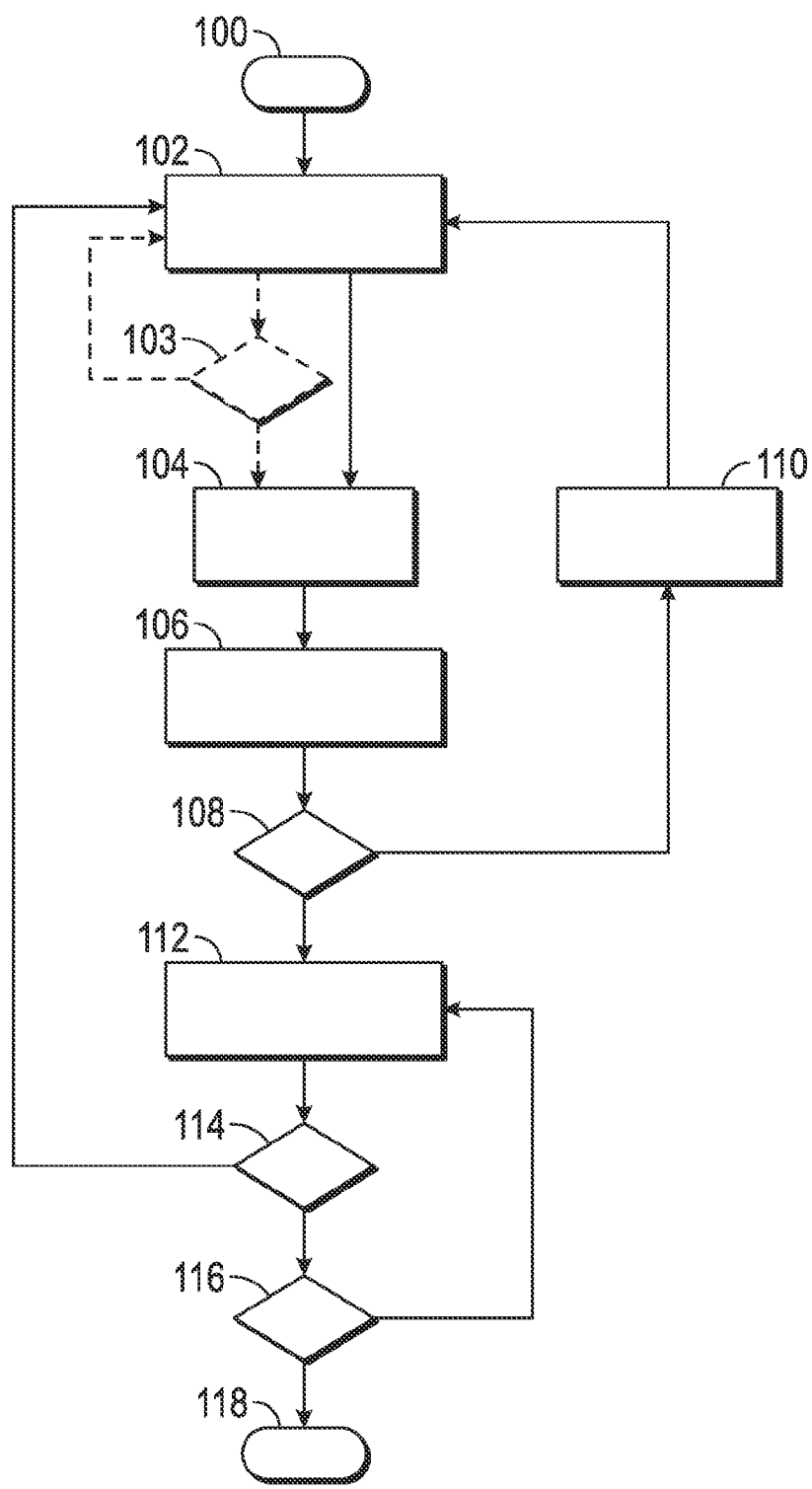
FIG. 3 is a flowchart illustrating a control method of the vibration mitigation system in accordance with various embodiments.

Referring now to FIG. 3, and with continued reference to FIGS. 1 and 2, a flowchart illustrates a control method that can be performed by the control module 24 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or can run continually during operation of the vehicle 10.

The method can begin at 100. At 102, the method can receive accelerometer data 46 from the first sensor 36 and the speed data 47 from the second sensor 37. Optionally, at 103, the method can determine if the speed data 47 indicates that the vehicle 10 is travelling above a predetermined threshold speed. If the vehicle 10 is travelling above a predetermined threshold speed, then at 104, the method can determine the amount of vibration experienced by the vehicle 10 based on the accelerometer data 46. At 106, the method can determine the phase angle of the wheel 14a relative to the phase angle of the wheel 14b by receiving the wheel phase angle A data 50 and the wheel phase angle B data 52 from the respective sensor 30a, 30b.

At 108, the method can determine if the vibration experienced by the vehicle 10 is below a predetermined threshold. For example, the method can determine if the wheel phase angle A data 50 and the wheel phase angle B data 52 are different than the last observed wheel phase angle A data 50 and the wheel phase angle B data 52 from the last phase angle data 53. If the wheel phase angle A data 50 and the wheel phase angle B data 52 are lower than the last measured wheel phase angle A data 50 and wheel phase angle B data 52, then the method can store the wheel phase angle A data 50 and the wheel phase angle B data 52 as good at 110 in the data store 51 and loop to 102.

Otherwise, if the measured wheel phase angle A data 50 and the wheel phase angle B data 52 are higher than the last measured wheel phase angle A data 50 and the wheel phase angle B data 52, then the method at 112 can adjust the phase angle of the wheels 14a, 14b so that the phase angles are substantially the same, including, but not limited to, applying a braking force to a respective caliper 28a, 28b. Generally, the phase angles of the wheels 14a, 14b can be adjusted by changing a speed of at least one of the wheels 14a, 14b.

At 114, the method can determine if the phase angle of the wheel 14a and/or the phase angle of the wheel 14b has changed. If the phase angle of the wheel 14a and/or the wheel 14b has changed, then the method can go to 102. Otherwise, the method can go to 116. At 116, the method can determine if all phase angles of the wheel 14a and/or wheel 14b have been tried. If not every phase angle has been tried, the method can go to 112. If every phase angle has been tried, the method can end at 118. Optionally, the method can send a notification message to a computer onboard the vehicle 10 to have the vehicle 10 serviced.

It should be noted that although the vibration mitigation system is described herein as being used with the brake system 22 to adjust the phase angle of the wheels 14a, 14b, various other systems and methods could be employed to adjust the phase angles of the wheels 14a, 14b, including, but not limited to, systems and methods for inflating or deflating a respective tire 16a, 16b to adjust the phase angle, and systems and methods for adjusting a torque of an axle coupled to the wheels 14a, 14b.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vibration mitigation system for a vehicle, comprising:
   a first sensor that generates a first signal that indicates a first phase angle of a first wheel of the vehicle;
   a second sensor that generates a second signal that indicates a second phase angle of a second wheel of the vehicle;
   an accelerometer coupled to the vehicle that generates an accelerometer signal; and
   a control module that determines that the vehicle is experiencing a vibration based on the accelerometer signal, that determines that the first phase angle of the first wheel and the second phase angle of the second wheel are different than a last measured first phase angle and a last measured second phase angle, and that outputs a third signal based on the determined vibration and the determination that the first phase angle of the first wheel and the second phase angle of the second wheel are different than the last measured first phase angle and the last measured second phase angle to adjust at least one of the first phase angle and the second phase angle.

2. The system of claim 1, wherein the control module adjusts the at least one of the first phase angle and the second phase angle when the first phase angle is different than the second phase angle.

3. The system of claim 2, wherein the control module adjusts the at least one of the first phase angle and the second phase angle so that the first phase angle and the second phase angle are substantially the same.

4. The system of claim 1, further comprising:
   a first rotor coupled to the first wheel; and
   a second rotor coupled to the second wheel,
   wherein the first sensor observes the first rotor to generate the first signal and the second sensor observes the second rotor to generate the second signal.

5. The system of claim 4, wherein the first rotor and the second rotor each include at least one tooth, and the first sensor and the second sensor observe the at least one tooth of the respective first rotor and second rotor.

6. The system of claim 5, wherein the control module adjusts the at least one of the first phase angle and second phase angle by outputting the third signal to at least one of the first caliper and the second caliper to apply at least one of the first braking force and second braking force to at least one of the first rotor and second rotor.

7. The system of claim 4, further comprising:
   a first caliper coupled to the first rotor that applies a first braking force to slow the rotation of the first rotor; and
   a second caliper coupled to the second rotor that applies a second braking force to slow the rotation of the second rotor.

8. A vehicle, comprising:
   a first wheel;
   a second wheel spaced apart from the first wheel;
   an accelerometer coupled to the vehicle that generates accelerometer data;
   a first sensor that determines a first phase angle of the first wheel;
   a second sensor that determines a second phase angle of the second wheel; and
   a control module that determines the vehicle is experiencing a vibration based on the accelerometer data, that determines that the first phase angle of the first wheel and the second phase angle of the second wheel are different than a last measured first phase angle and a last measured second phase angle, and that adjusts a speed of the first wheel or a speed of the second wheel based on the determined vibration and the determination that the first phase angle of the first wheel and the second phase angle of the second wheel are different than the last measured first phase angle and the last measured second phase angle so that the first phase angle and second phase angle are substantially the same.

9. The vehicle of claim 8, wherein the accelerometer observes the acceleration of the vehicle in at least one of a lateral direction and a vertical direction relative to a longitudinal axis of the vehicle.

10. The vehicle of claim 8, wherein the first phase angle is different than the second phase angle.

11. The vehicle of claim 8, wherein the control module adjusts the speed of the first wheel or the speed of the second wheel by applying a braking force to a respective one of the first wheel and the second wheel.

12. A method of mitigating vibration in a vehicle, comprising:
   receiving an input;
   based on the input, determining the vehicle is experiencing a vibration;
   determining that the vibration experienced by the vehicle is above a threshold;
   determining a first wheel phase angle associated with a first wheel;
   determining a second wheel phase angle associated with a second wheel;
   determining the first phase angle of the first wheel and the second phase angle of the second wheel are different than a last measured first phase angle and a last measured second phase angle;
   outputting a signal to adjust the first wheel phase angle or second wheel phase angle based on the determination that the first phase angle of the first wheel and the second phase angle of the second wheel are different than the last measured first phase angle and the last measured second phase angle.

13. The method of claim 12, wherein receiving an input further comprises:
   receiving an input from an accelerometer coupled to the vehicle.

14. The method of claim 12, wherein determining the first wheel phase angle associated with the first wheel further comprises:
   receiving an input from a first sensor associated with the first wheel of the vehicle.

15. The method of claim 12, wherein determining the second wheel phase angle associated with the second wheel further comprises:
   receiving an input from a second sensor associated with the second wheel of the vehicle.

16. The method of claim 12, wherein outputting the signal to adjust the first wheel phase angle or second wheel phase angle further comprises:
   outputting a signal to adjust a speed of the first wheel or a speed of the second wheel.

17. The method of claim 16, wherein outputting the signal to adjust the speed of the first wheel or the speed of the second wheel further comprises:
   outputting the signal to a braking system to apply a braking force to the first wheel or the second wheel.

* * * * *